US011211176B2

(12) United States Patent
Scott

(10) Patent No.: US 11,211,176 B2
(45) Date of Patent: Dec. 28, 2021

(54) CONTINUOUS REPROCESSING OF SPENT NUCLEAR FUEL

(71) Applicant: Ian Richard Scott, Warwickshire (GB)

(72) Inventor: Ian Richard Scott, Warwickshire (GB)

( * ) Notice: Subject to any disclaimer, the term of this patent is extended or adjusted under 35 U.S.C. 154(b) by 0 days.

(21) Appl. No.: 16/965,329

(22) PCT Filed: Jan. 30, 2019

(86) PCT No.: PCT/GB2019/050249
§ 371 (c)(1),
(2) Date: Jul. 28, 2020

(87) PCT Pub. No.: WO2019/150099
PCT Pub. Date: Aug. 8, 2019

(65) Prior Publication Data
US 2021/0005336 A1 Jan. 7, 2021

(30) Foreign Application Priority Data
Feb. 3, 2018 (GB) ...................................... 1801783

(51) Int. Cl.
*G21C 19/50* (2006.01)
*C25C 3/34* (2006.01)
(Continued)

(52) U.S. Cl.
CPC ................ *G21C 19/50* (2013.01); *C25C 3/34* (2013.01); *C25C 3/36* (2013.01); *C25C 7/005* (2013.01); *G21C 19/48* (2013.01)

(58) Field of Classification Search
CPC .. C25C 3/34; C25C 3/36; G21C 19/48; G21C 19/50
See application file for complete search history.

(56) References Cited

U.S. PATENT DOCUMENTS 3,052,611 A * 9/1962 Piper .......................... C25C 3/34
205/47
3,081,237 A * 3/1963 Piper ........................ H01B 1/00
205/46
(Continued)

FOREIGN PATENT DOCUMENTS

CN 105132953 A 12/2015
GB 2330448 A 4/1999
(Continued)

OTHER PUBLICATIONS

Polson et al. A Conceptual Cell for Electrowinning Liquid Uranium. Downloaded from UNT Digital Library. (Year: 1969).*
(Continued)

*Primary Examiner* — Ciel P Contreras
(74) *Attorney, Agent, or Firm* — Renner, Otto, Boisselle & Sklar, LLP

(57) ABSTRACT

Spent nuclear fuel is added to an electro-reduction cell, wherein the electro-reduction cell includes a halide salt electrolyte, and anode, and a cathode including an alloy of uranium and a first metal forming a low melting point alloy with uranium, the first metal being one or more of: iron; chromium; nickel; manganese; and cobalt. The spent nuclear fuel is electrochemically reduced at a potential sufficient to reduce plutonium and lanthanides in the spent nuclear fuel, to form a molten alloy of the first metal, uranium and higher actinides present in the spent nuclear fuel. The alloy is extracted from the electro-reduction cell while uranium oxide is present in the electro-reduction cell. The spent nuclear fuel includes uranium oxide and at least 1 mol of lanthanides per tonne of uranium in the spent nuclear fuel, and the electro-reduction cell is operated at a temperature above the melting point of the alloy.

10 Claims, 4 Drawing Sheets

(51) Int. Cl.
*C25C 3/36* (2006.01)
*C25C 7/00* (2006.01)
*G21C 19/48* (2006.01)

(56) References Cited

U.S. PATENT DOCUMENTS

| | | | |
|---|---|---|---|
| 3,272,726 A * | 9/1966 | Gibson | ............ C25C 3/34 |
| | | | 205/47 |
| 3,406,103 A | 10/1968 | Raetzsch | |
| 4,995,948 A * | 2/1991 | Poa | ............ C25C 3/34 |
| | | | 204/241 |
| 5,141,723 A | 8/1992 | Miller | |
| 5,310,476 A | 5/1994 | Sekhar | |
| 5,582,706 A | 12/1996 | Grantham et al. | |
| 2004/0244533 A1 | 12/2004 | Lewin | |
| 2007/0187230 A1 | 8/2007 | Bayer | |
| 2012/0160704 A1 | 6/2012 | Wiedmeyer et al. | |

FOREIGN PATENT DOCUMENTS

| | | |
|---|---|---|
| GB | 2548378 A | 9/2017 |
| GB | 2554068 A | 3/2018 |
| JP | H09-228089 A | 9/1997 |
| WO | 2017/158335 A1 | 9/2017 |

OTHER PUBLICATIONS

Office Action for corresponding CN Application No. 201980010335.2 dated Nov. 11, 2020.
International Search Report for corresponding Application No. PCT/GB2019/050249, dated Sep. 3, 2019.
International Preliminary Report on Patentability for corresponding Application No. PCT/GB2019/050249, dated Mar. 31, 2020.
Search Report for corresponding GB Application No. 1801783.0, dated Aug. 2, 2018.

* cited by examiner

CONTINUOUS REPROCESSING OF SPENT NUCLEAR FUEL

FIELD OF THE INVENTION

The invention relates to the reprocessing of spent nuclear fuel, in particular spent nuclear fuels containing uranium oxide.

BACKGROUND

Conversion of spent uranium oxide nuclear fuel into a plutonium rich molten salt fuel was described in the PCT application with publication number WO/2017/158335. The first step in the process described was electro-reduction of uranium oxide above the melting point of the uranium or uranium alloy produced. The problem with such electro-reduction that had been observed earlier was that the molten metal produced failed to agglomerate into a continuous molten phase. This problem was solved in WO/2017/158335 by reducing the uranium oxide in batches, with a period of reduction continuing without addition of more uranium oxide between batches of uranium oxide. During this period, higher actinides and some lanthanides were reduced to their metals, dissolved in the alloy and residual uranium oxide which was preventing agglomeration of the molten uranium metal was chemically reduced by the dissolved higher actinides and lanthanides.

While this method appears effective, it prevents continuous operation of the process, producing a uranium alloy containing higher actinides and certain lanthanides in a batch approach. Batch processes are generally more costly but in the context of plutonium they are also severely limited in batch size, which is limited by the amount of plutonium that can be accumulated in the electrolyte before nuclear criticality concerns become unacceptable.

A further problem with the batch process is that the inter-batch reduction process produces a mixed metal phase of actinides and lanthanides which are not mutually soluble. This inter-batch alloy must be mixed with the larger mass of primarily uranium alloy produced during the preceding batch reduction and mixed until the lanthanides dissolve in the larger mass of uranium. This adds substantial complexity and the production of a concentrated plutonium rich alloy at this stage imposes yet more stringent limits on the batch size that can be used without experiencing criticality problems.

Finally, the batch process exposes the material containing the uranium alloy to substantially stronger reducing conditions which excludes use of commercial ceramics such as zirconia from the application. In particular, molten lanthanides as a separate metal phase are very aggressive reducers of ceramic oxides.

There remains a need therefore for a method of electro-reduction, and conversion of the resulting uranium alloy to molten salt fuel which can be operated continuously but still achieves full agglomeration of the alloy into a single metal phase.

SUMMARY

According to a first aspect of the invention, there is provided a method of reprocessing spent nuclear fuel. The spent nuclear fuel is added to an electro-reduction cell, wherein the electro-reduction cell comprises a halide salt electrolyte, and anode, and a cathode comprising an alloy of uranium and a first metal forming a low melting point alloy with uranium, the first metal being one or more of:

iron;
chromium;
nickel;
manganese; and
cobalt.

The spent nuclear fuel is electrochemically reduced at a potential sufficient to reduce plutonium and lanthanides in the spent nuclear fuel, in order to form a molten alloy of the first metal, uranium and higher actinides present in the spent nuclear fuel. The alloy is extracted from the electro-reduction cell while uranium oxide is still present in the electro-reduction cell. The spent nuclear fuel comprises uranium oxide and at least 1 mol of lanthanides per tonne of uranium in the spent nuclear fuel, and the electro-reduction cell is operated at a temperature above the melting point of the alloy.

According to a second aspect, there is provided apparatus for reprocessing spent nuclear fuel. The apparatus comprises an electro reduction cell, a feed, an alloy removal system, and a controller. The electro-reduction cell comprises a tank, an anode and a cathode, and a heating system. The tank is configured to contain a halide salt electrolyte. The anode and cathode are located within the tank and configured to electrochemically reduce spent nuclear fuel at a potential sufficient to reduce plutonium and lanthanides in the spent nuclear fuel, in order to form an alloy of a first metal, uranium and higher actinides present in the spent nuclear fuel, the cathode comprising an alloy of uranium and the first metal, the first metal being one or more of:

iron;
chromium;
nickel;
manganese; and
cobalt.

The heating system is configured to maintain the tank at a temperature above a melting point of the alloy. The feed is configured to provide spent nuclear fuel to the electro-reduction cell, the spent nuclear fuel comprising uranium oxide and at least 1 mole of lanthanides per tonne of uranium. The alloy removal system is configured to remove the alloy from the electro-reduction cell. The controller is configured to cause the alloy removal system to remove the alloy from the electro-reduction cell while uranium oxide remains in the cell.

According to a third aspect, there is provided a method of detecting failure of a ceramic coating of an electrolysis cell. The electrolysis cell comprises an electrically conductive tank connected to electrical ground and having a ceramic coating on its inner surface, and containing an electrolyte, and anode, and a cathode, such that in normal use the electrolyte is not in contact with the electrically conductive material of the tank. Current is monitored between the electrically conductive tank and the electrical ground while the electrolysis cell is operating. A rise in said current is detected. In response to detecting a rise in said current, it is determined that the ceramic coating has failed.

According to a fourth aspect, there is providedn apparatus for use as an electrolysis cell. The apparatus comprises an electrically conductive tank, an electrolyte, anode, and cathode, and a controller. The electrically conductive tank is connected to electrical ground and has a ceramic coating on its inner surface. The electrolyte, anode, and cathode are contained within the electrically conductive tank such that in normal use the electrolyte is not in contact with the electrically conductive material of the tank. The controller is configured to:

monitor current between the electrically conductive tank and the electrical ground while the electrolysis cell is operating;

detect a rise in said current;

in response to detecting a rise in said current, determine that the ceramic coating has failed.

Further embodiments are set out in claim 2 et seq

DESCRIPTION

It has been unexpectedly discovered that the addition of a metal such as iron, or other metal that reduces the melting point of the uranium alloy, to the molten uranium cathode in an electroreduction process (as described as a possible but rather undesirable option in WO/2017/158335) has an effect on the electrochemical behaviour of the reduction cell beyond the simple reduction in operating temperature described in WO/2017/158335.

Figure 1:
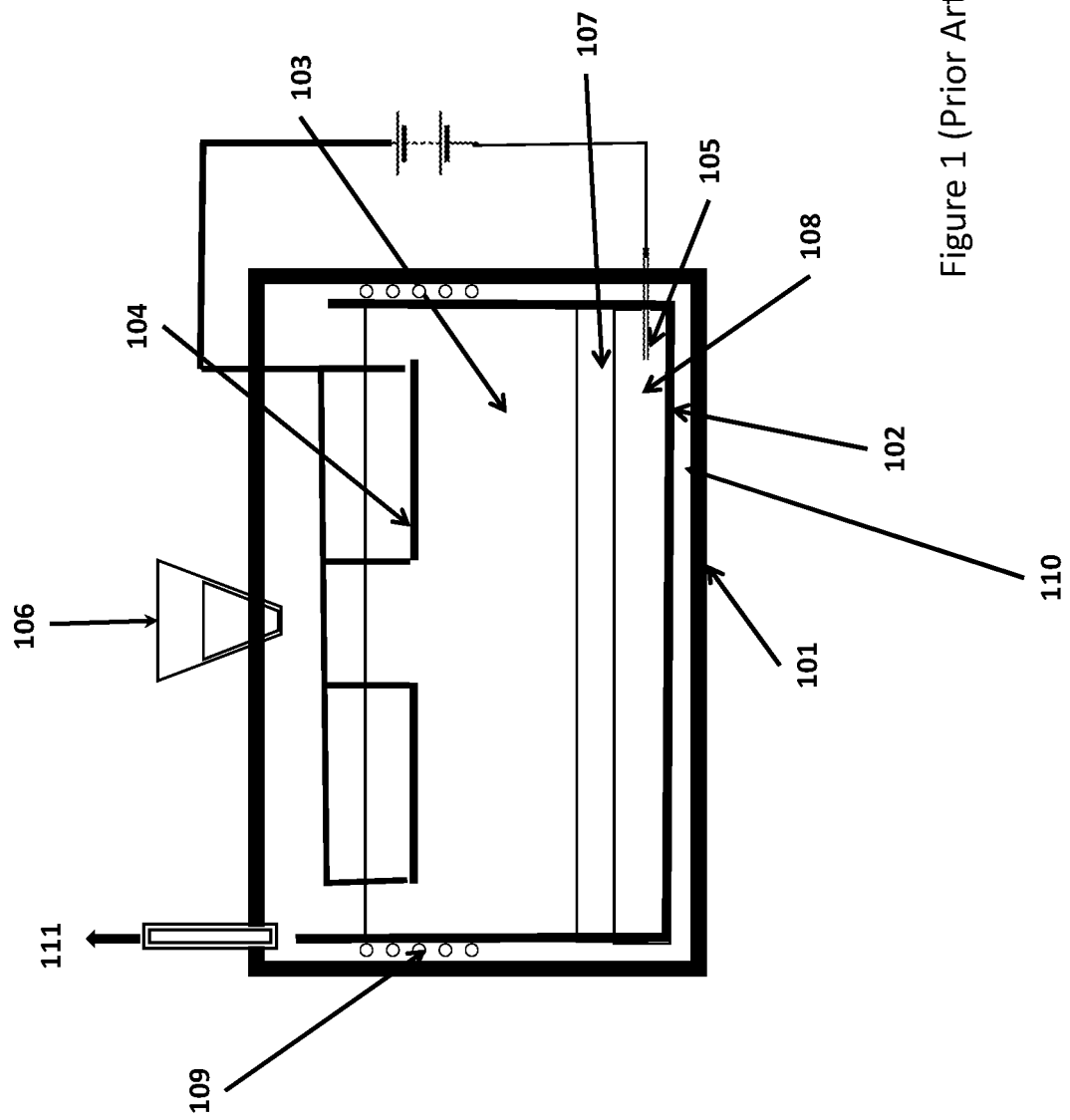
FIG. 1 is a schematic diagram of an electro-reduction cell for reducing spent nuclear fuel.

FIG. 1 shows the apparatus of WO/2017/158335. The apparatus comprises an outer structure 101, which encloses an electrolysis tank 102. The electrolysis tank 102 contains an electrolyte 103 in which is immersed an anode 104 (preferably located towards the top of the electrolyte) and a cathode 105. Spent nuclear fuel is added from a feed 106 into the electrolyte, and forms a layer 107. As current is passed between the anode and cathode, the spent fuel is electrochemically reduced to form an alloy 108 at the cathode 105. The alloy sinks to the bottom of the tank 102, and the cathode is preferably located such that the cathode will be immersed in the alloy when it forms. The process is performed at a temperature such that the resulting alloy is molten—the temperature is controlled by means of heaters and cooling ducts 109 located within insulation 110 placed between the outer structure and the tank. The electrolysis product at the anode will generally be a gas (e.g. oxygen where the spent fuel is an oxide fuel, or a halide where the spent fuel is a molten salt fuel), and this is released via an off gas tube 111 to a condenser (not shown). The apparatus also comprises an alloy removal system (not shown) for removing the molten alloy from the electrolysis tank.

WO/2017/158335 makes no suggestion that adding iron to the cell affects the requirement set out in that patent that electrolysis must be continued until essentially all the uranium oxide or halide is reduced to metal in order for the molten alloy to successfully agglomerate into a uniform molten metal phase without entrained uranium oxide. It has now been unexpectedly found that provided iron or a similar metal (e.g. chromium, cobalt, manganese, or nickel, or some combination) is added to the molten cathode, electrolysis conditions can be devised for a uranium oxide fuel which result in agglomeration of the uranium alloy cathode into a uniform metal phase even though uranium oxide remains in the electro-reduction cell (i.e. in contact with the cathode). In order to ensure that the alloy forms, the electrochemical cell should be initiated with a molten uranium iron (or uranium plus another metal) alloy at the cathode, rather than solid iron (or other metal). The electrochemical cell is otherwise as illustrated in FIG. 1. The key to the required electrolysis condition is that the current density or cathode overpotential must cause reduction of at least a portion of one of the major lanthanide fission products present in spent nuclear fuel, e.g. cerium or neodymium, to their metal form which then dissolves in the molten uranium alloy cathode.

Without wishing to be bound by theory, we believe that the reason for this unexpected result is that molten lanthanide metals such as cerium and neodymium are essentially immiscible in molten uranium but have substantial solubility in a uranium iron alloy (or an alloy of uranium and any combination of the metals noted above). This higher solubility reduces the activity coefficient of the lanthanide metal in the alloy so that significant reduction of the lanthanides to their metal form takes place under conditions which with a pure uranium cathode would not result in significant reduction. The dissolved lanthanide metals then chemically reduce the entrained uranium or higher actinide oxides in the alloy to uranium or higher actinides, producing as by-product lanthanide oxides which rise to the surface of the molten alloy as a result of their much lower density than uranium or higher actinide oxides. This allows the cathode to agglomerate into a uniform metal phase.

The inventive process thus requires all of the following conditions.

1) Incorporation into the molten cathode of iron, chromium, cobalt, manganese, and/or nickel which each reduce the melting point of uranium and increases the solubility of lanthanides metals in the alloy 2) Electrolysis at a sufficiently high current density to cause reduction of lanthanide oxides or oxyhalides to metal dissolved in the uranium alloy cathode, even though excess uranium oxide remains in contact with the cathode 3) Presence of lanthanides (e.g, cerium or neodymium) in the spent fuel or, where levels of lanthanides are less than 1 mol/tonne uranium (for example in low burnup fuel) addition of a suitable lanthanide along with the spent fuel.

The selection of the optimal current density is a necessarily empirical process.

It is well known in the art that very high overpotentials can be applied in molten salt electrolysis without resulting in co-reduction of metals with significantly different reduction potentials. For example, reduction of a mixture of calcium chloride and sodium chloride in a Downs Cell results in production of pure sodium with negligible calcium contamination even at high electrode potentials and current densities. The discovery that uranium co-reduces with higher actinides and even lanthanides at such high overpotentials even when an excess of uranium oxide is present is therefore surprising.

Without wishing to be bound by theory, we hypothesise that the reason that co-reduction occurs with uranium oxide as the main reducible material is the solid form and very low solubility of the uranium oxide in the electrolyte. This results in the rate of reduction of the uranium oxide being largely kinetically rather than thermodynamically limited which allows for co-reduction of the higher actinides when there is still unreduced uranium oxide in the cell. This hypothesis is supported by the observation that spent nuclear fuel in pellet form more readily co-reduces with plutonium and higher actinides than is the case with powdered oxide fuel where higher current density and overpotential is required to achieve co-reduction.

The precise current density and voltages required will be affected by the geometry of the electro-reduction cell, the composition of the electrolyte, the nature of both the anode and cathode, the particle size and porosity of the feedstock spent uranium oxide fuel and the lanthanide content of the spent fuel. The inventive process thus uses an empirically determined current density leading to a cathode overpotential that is high enough to reduce lanthanides in the spent fuel to metal simultaneously with the reduction of the uranium and higher actinide oxides. For example, the overpotential may reduce at least 5% of the cerium or neodymium in the spent fuel to metal simultaneously with the reduction of the uranium and higher actinide oxides This process permits continuous or semi-continuous addition of spent oxide fuel to the electro-reduction cell with continuous or semi-continuous withdrawal of the resulting molten alloy. By semi-continuous, is meant that aliquots of feedstock or product are added or withdrawn from the apparatus in quantities substantially lower than the quantity in the apparatus. In either the continuous or semi-continuous case, in contrast to the method of WO/2017/158335, alloy is withdrawn while unreduced uranium oxide is still present in the electrolysis cell (in addition to any potential withdrawal after full reduction of the uranium oxide, e.g. when shutting down the continuous process). The alloy will consist primarily of uranium, higher actinides, lanthanides, noble and semi-noble metal fission products and other metals such as iron added along with the uranium oxide feedstock to reduce the melting point of the alloy.

As the process continues to operate, fission products accumulate in the electrolyte and the concentrations of plutonium and americium not co-reduced with the uranium and therefore remaining in the electrolyte rise to an equilibrium level where addition of those elements in the spent nuclear fuel feedstock is equal to the rate of reduction of the elements and their removal in the molten alloy.

The electrolyte must be replaced either when the heat producing capacity of the accumulated fission products (primarily caesium and strontium) exceeds the cooling capacity of the electroreduction cell or when the accumulation of certain fission products (again primarily caesium and strontium) results in sufficient co-reduction of the fission products with the uranium oxide as to seriously contaminate the molten alloy.

Rendering the electrolyte substantially actinide free is a desirable feature of the process described in WO/2017/158335. That benefit is lost in the continuous process where periodic exhaustive reduction of the electrolyte is not carried out. An additional process is therefore required to remove residual actinides from the electrolyte prior to the disposal of the electrolyte as radioactive waste.

The spent electrolyte can be cleaned of residual actinides by a number of procedures including exhaustive electrolysis (i.e. by ceasing adding new spent fuel, and continuing electrolysis until all of the actinides are reduced and dissolved into the alloy). The preferred method however is extraction of the actinides by exchange between the electrolyte and a molten metal such as bismuth or cadmium containing a dissolved metal that is more reactive than the actinides. Calcium is the preferred reactive metal although other group 1 & 2 metals such as magnesium or sodium can also be used. The exchange can be carried out in a multi-stage process, conveniently carried out in a column where the metal/salt exchange happens in a countercurrent manner over a number of "plates".

For industrial application, a particularly useful approach to the removal of residual actinides is to withdraw the spent electrolyte continuously or in small batches, recover the actinides into molten cadmium/calcium alloy then return the cadmium plus actinides to the electro-reducer along with replacement fresh electrolyte. The cadmium volatilises at the temperature of the electrolyte and is recovered in the off gas condenser system from the electro-reducer cell along with fission product cadmium from the spent fuel. With this approach, the composition of the electrolyte can be maintained substantially constant over months or years of operation resulting in greater uniformity of the output molten alloy.

The molten alloy is converted to molten salt nuclear fuel as described in WO/2017/158335 through contacting the molten alloy with a molten salt mixture containing a salt that will be reduced to its metal by higher actinides or lanthanides in the molten alloy. This can be a batchwise operation or operated continuously in direct linkage to the output of the electro-reduction cell or with intervening storage of the alloy. Where the feedstock spent nuclear fuel is of low burnup and therefore contains lower amounts of lanthanide fission products than plutonium then direct extraction of the combined lanthanide and higher actinide components of the uranium alloy is practical. With higher burnup fuels, where higher concentrations of lanthanides are present however a pre-extraction of the molten alloy may be required whereby the higher proportions of the lanthanides in the spent fuel are reduced to lower concentrations by contacting the alloy with sufficient molten salt, typically $UCl_3$ or $FeCl_2$ together with NaCl, to extract a substantial fraction of the lanthanides into the salt while leaving substantially all of the higher actinides in the metal. The molten alloy output of that pretreatment stage can then be contacted with further molten salt to remove the remainder of the lanthanides and substantially all of the higher actinides from the molten alloy into the molten salt.

While direct flow of alloy from the electro-reducing cell to the molten salt contacting apparatus can be industrially efficient, the fact that the electroreduction stage must be carried out in a high radiation facility (a hot cell) while the molten salt contacting stage can be carried out in a lower radioactivity facility means it can be convenient to extract the molten alloy from the electroreduction cell and cast it under an inert gas into solid metal pellets which are easily handled, mixed in bulk and transferred to the molten salt contacting apparatus where the pellets are remelted.

A particularly simple procedure for the molten salt extraction of higher actinides from the alloy results from the inclusion of iron in the molten uranium alloy cathode. At the temperatures of molten uranium (1100 C) the separation factor for extracting plutonium and americium from the alloy into an NaCl based salt is relatively poor with 15% of the plutonium and 25% of the americium remaining in the alloy after a single extraction. At the lower temperature of 800 C permitted by inclusion of iron in the alloy, less than 2% of both plutonium and americium remain in the alloy.

Figure 2B:
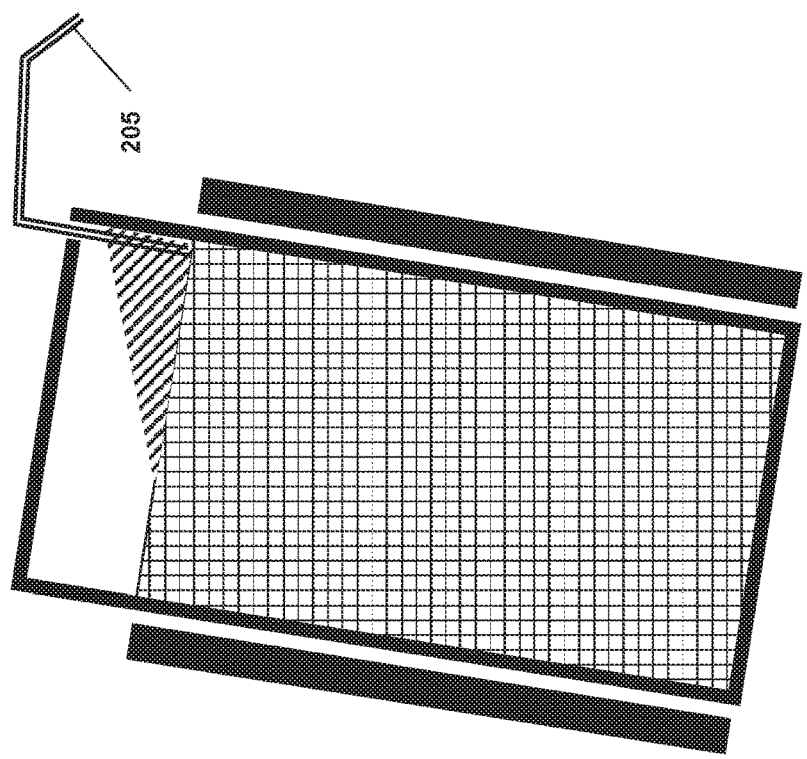
FIGS. 2A and 2B are schematic diagrams of an apparatus for removing higher actinides from a uranium alloy.
Figure 2A:
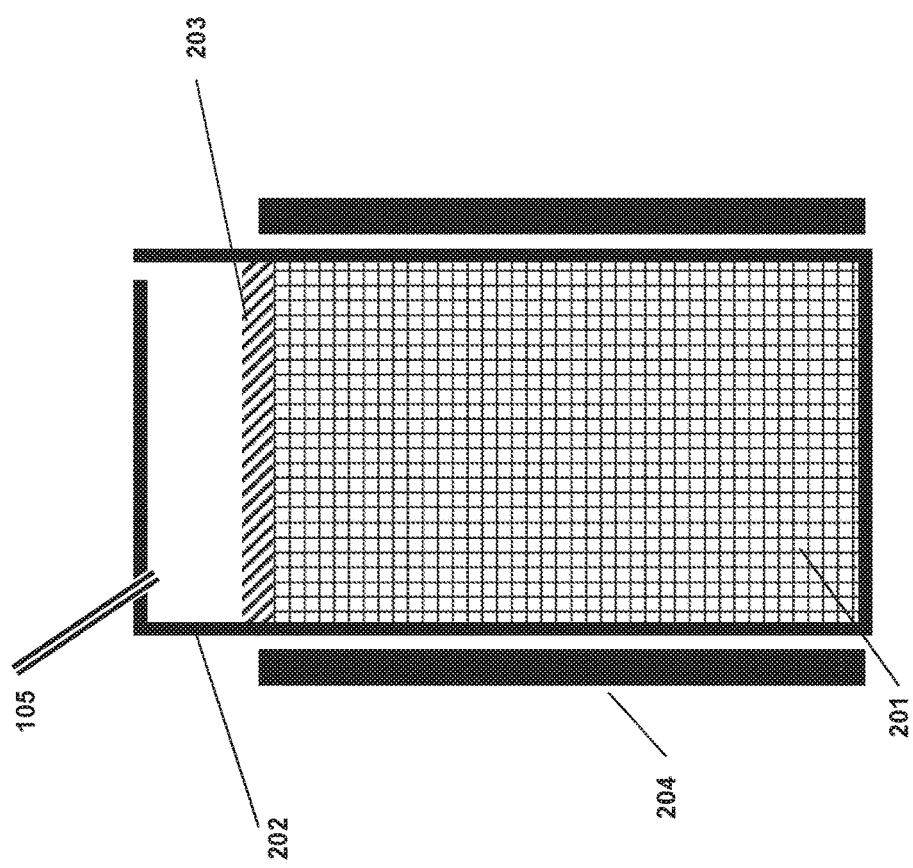

It is therefore practical to use a simple batchwise extraction process to recover the higher actinides from the uranium alloy. A suitable apparatus for such a process is shown in FIGS. 2A and 2B. The alloy 201 is accumulated, via the dip tube 105 from the electro-reduction cell, in a carbon steel container 202 coated with an yttria wash to protect the steel from corrosion by the molten uranium alloy. The time of contact is very limited so plasma spraying is not required though it is an option. Use of such washes in uranium casting is a well established method.

Prior to addition of the alloy to this container, the container is heated empty in an argon atmosphere to 800° C. This causes the carbon in the steel to reduce the oxide layer on the steel surface to metal. This prevents the oxide layer from reacting with plutonium in the alloy forming plutonium oxide which will not extract into the salt.

The salt 203 is added to the container and the alloy melted using induction heater/stirrers 204 in standard industrial forms. Efficient stirring of the deep layer of alloy ensures rapid equilibration of the two phases and is conveniently achieved in a non-contact manner by use of induction heaters to melt and stir the alloy. Mechanical stirring of the alloy is also possible as an alternative to the induction heaters. The salt phase does not require stirring as it is very shallow and mixes adequately by convection.

When equilibration is complete, the container is allowed to cool until the uranium alloy freezes (725° C.). At that temperature the salt remains liquid and is withdrawn via a suction dip tube 205 after the entire apparatus has been tilted as shown in FIG. 2B.

A single extraction is predicted to recover 98% of the Pu and Am into the salt layer. However, the remaining few % and any residual salt not recovered via the dip tube can be recovered by repeating the process with a fresh batch of salt. That second extraction will recover essentially all the Pu/Am in a salt which will be essentially 60% NaCl/40% $UCl_3$. That second salt extract can then be used to carry out the first extraction of the next batch of uranium alloy.

Extraction of alloy from the electroreduction cell is conveniently via a dip tube formed from a uranium alloy resistant material such as aluminium nitride or yttria coated steel with the alloy being transferred by differential gas pressure without the need for penetrations of the crucible containing the molten alloy cathode.

For a continuous electro-reduction process to be practical, it is desirable that the materials of the electro-reduction cell have long lives under the conditions of operation. This is challenging where uranium alloy is produced because such alloys are known to corrode virtually all metals, including refractory metals such as tantalum. Ceramic containers are therefore desirable, but most ceramics are reduced to their metals by the highly reactive uranium and even more so, higher actinides and lanthanides. The most resistant ceramic oxide is known to be yttria but this has very limited physical strength and resistance to thermal cycling. Coating of metals with yttria by techniques such as plasma spraying have been explored. However, yttria has low but not insignificant solubility in molten salts and such protective coatings must be regularly inspected and repaired. Such a process is very challenging in the high radiation environment of nuclear fuel reprocessing.

A novel method has been devised to overcome this difficulty of inspection. Plasma sprayed yttria (yttrium oxide) linings have very low electrical conductivity and there is therefore negligible current leakage from the molten uranium alloy cathode to the structural metal underlying the yttria coating. Even a small failure of the yttria lining however results in a large current leakage from the cathode to the structural metal and hence to earth. Incorporation of a suitable earth leak detector into the apparatus thus provides immediate warning of any failure of the yttria lining before the uranium alloy can significantly corrode the structural metal of the electrolysis cell.

Figure 3:
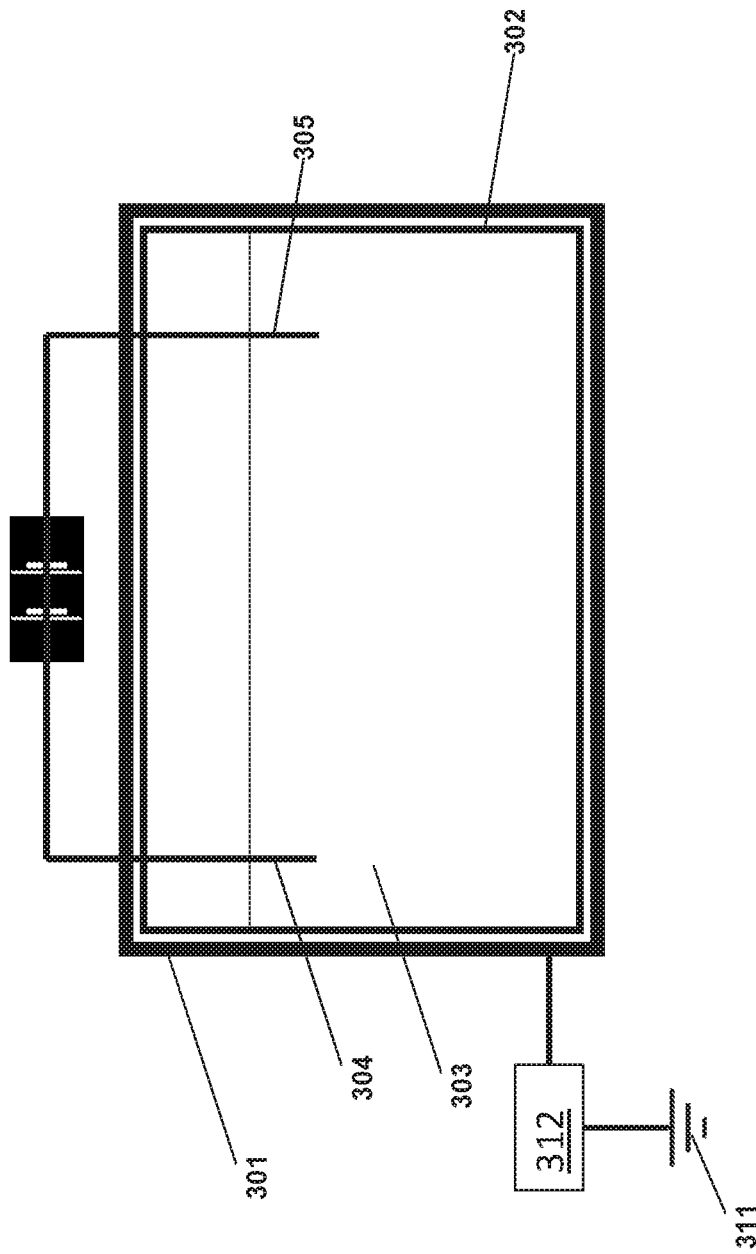
FIG. 3 is a schematic diagram of an electrolysis cell.

In fact, this approach is generalizable to any ceramic-coated electrolysis cell, as shown schematically in FIG. 3. The electrolysis cell comprises a metal tank 301, which is connected to electrical ground 311 and has on its inner surface a non-conductive ceramic coating 302. The electrolysis cell contains an electrolyte 303, in which are immersed an anode 304 and a cathode 305. When the ceramic coating is intact, the metal tank is insulated from the electrolyte, and so no (or only a very small) current flows to ground 311. Where there is a break in the ceramic coating below the level of the electrolyte, a large current will flow to ground via the electrolyte, the break, and the metal tank, and this can be detected by a current detector 312.

Figure 4:
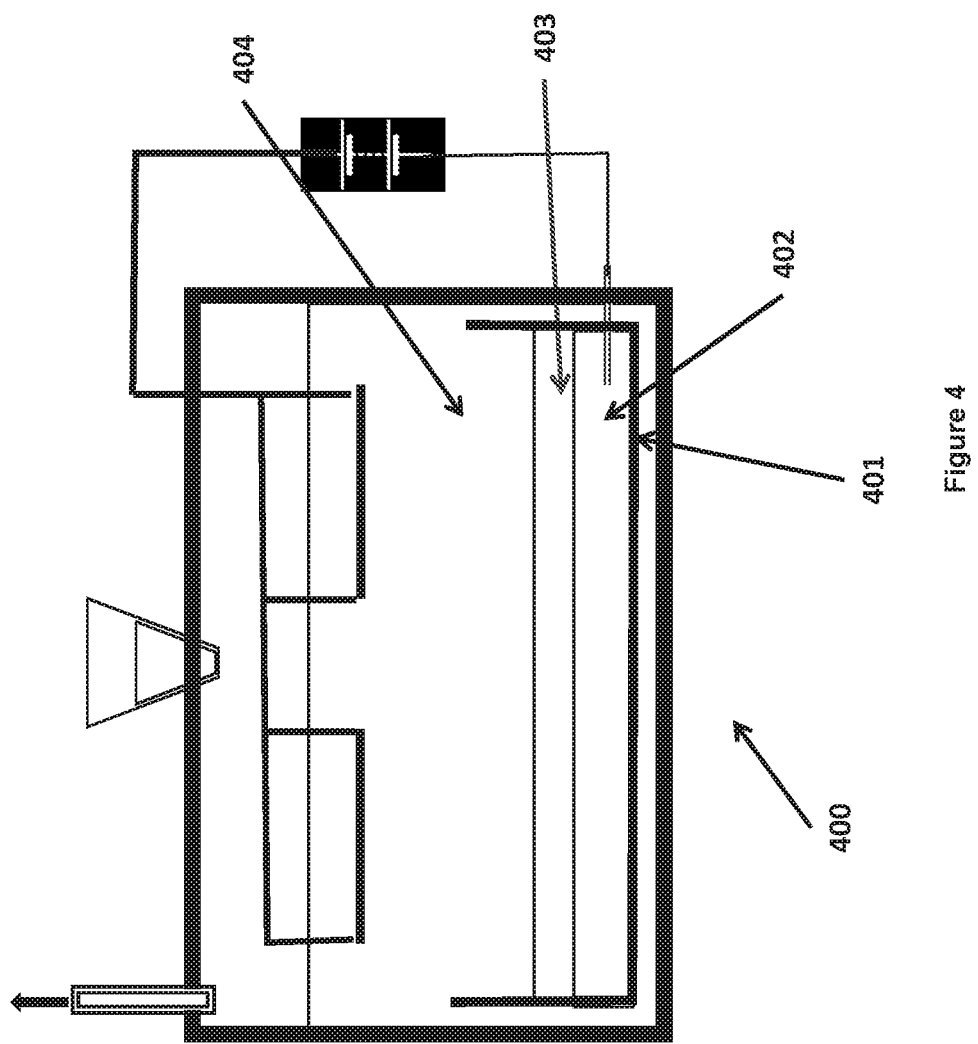
FIG. 4 is a schematic diagram of an alternative electro-reduction cell for reducing spent nuclear fuel.

An alternative to applying the yttria coating directly to the structural material of the electrolysis cell is shown in FIG. 4. The electrolysis cell 400 of FIG. 4 utilises a solid yttria crucible 401 to contain the molten cathode 402. The oxide pellets 403 float above the molten cathode 402 within the crucible. Other features of the cell may be as disclosed in any of the above examples. Such crucible are relatively fragile and have poor resistance to thermal shocks and thermal cycling. In order to provide them with a long operating life in the electro-reduction cell they can be entirely surrounded by the electrolyte 404. In this way the yttria crucible is protected from thermal stress. A further alternative is to use a lower cost and more robust ceramic for the electro reduction cell such as zirconia, magnesia, aluminium nitride, silicon carbide etc and to coat the structural ceramic with yttria, either with the ceramic in the "green" unfired form as a post firing procedure including plasma spraying as described above for metal cell materials In the case of any use of yttria in the electroreduction cell there is a challenge that yttria has significant solubility in molten salts. Yttria is however present in the spent nuclear fuel (as a fission product) and accumulates in the electrolyte and thereby radically reducing solubilisation of the yttria crucible. Optionally, powdered yttria can be added to the electrolyte to fulfil the same function where yttria from the spent fuel is insufficient to provide the necessary protection.

The invention claimed is:

1. A method of reprocessing spent nuclear fuel, the method comprising:
   adding the spent nuclear fuel to an electro-reduction cell, wherein the electro-reduction cell comprises a halide salt electrolyte, and anode, and a cathode comprising an alloy of uranium and a first metal forming a low melting point alloy with uranium, the first metal being one or more of:
   iron;
   chromium;
   nickel;
   manganese; and
   cobalt;
   wherein the spent nuclear fuel comprises uranium oxide, plutonium and other actinides having a higher atomic number than uranium, and at least 1 mol of lanthanides per tonne of uranium in the spent nuclear fuel wherein the electro-reduction cell is operated at a temperature above the melting point of the alloy;
   the method further comprising:
   electrochemically reducing the spent nuclear fuel at a potential sufficient to reduce plutonium and lanthanides in the spent nuclear fuel, in order to form a molten alloy of the first metal, uranium and the other actinides having a higher atomic number than uranium present in the spent nuclear fuel; and
   extracting the molten alloy from the electro-reduction cell, during the step of electrochemically reducing the spent nuclear fuel, and while uranium oxide is still present in the electro-reduction cell.

2. The method according to claim 1, wherein the lanthanides in the spent nuclear fuel comprise cerium or neodymium, and the potential is sufficient to reduce at least 5% of the cerium or neodymium in the spent fuel simultaneously with the uranium.

3. The method according to claim 1, and comprising:
- withdrawing a portion of the halide salt electrolyte from the electro-reduction cell;
- performing exchange between the withdrawn portion of the halide salt electrolyte and a molten second metal which is less reactive than the uranium, plutonium, and other actinides having a higher atomic number than uranium present in the spent nuclear fuel, the molten second metal having dissolved within it a third metal which is more reactive than the uranium, plutonium, and
- other actinides having a higher atomic number than uranium present in the spent nuclear fuel, in order to provide an electrolyte having a reduced level of actinides, and an alloy of the second metal and the actinides.

4. The method according to claim 3, and comprising returning the alloy of the second metal and the actinides to the electro-reduction cell.

5. The method according to claim 4, wherein the second metal volatilises at the operating temperature of the electro-reduction cell, and comprising collecting the second metal via an off-gas condenser system.

6. The method according to claim 1, and comprising extracting the other actinides having a higher atomic number than uranium from the extracted alloy by contact with a molten salt comprising a metal halide where the metal has a higher electronegativity than uranium.

7. The method according to claim 6, and comprising performing first and second rounds of extraction, each round of extraction comprising the step of extracting the other actinides having a higher atomic number than uranium, and each round of extraction further comprising withdrawing the molten salt.

8. The method according to claim 7, and comprising reserving the molten salt from the second round of extraction, and wherein the molten salt used for the first round of extraction is molten salt that has been used for a previous second round of extraction on a previously processed withdrawn alloy.

9. The method according to claim 6, and comprising:
- contacting the molten salt with the extracted alloy at a temperature above the melting point of the extracted alloy;
- reducing the temperature to a temperature below the melting point of the extracted alloy and above the melting point of the molten salt;
- withdrawing the molten salt.

10. The method according to claim 9, and comprising tilting the extracted alloy following the reduction of temperature and prior to withdrawal of the molten salt.

* * * * *